US012812031B2

(12) United States Patent
Singh et al.

(10) Patent No.: US 12,812,031 B2
(45) Date of Patent: Nov. 24, 2026

(54) SYSTEMS AND METHODS FOR AUTHENTICATING CALLS USING BLOCKCHAIN TECHNOLOGY AND CRYPTOLOGY

(71) Applicant: Samsung Electronics Company, Ltd., Suwon si (KR)

(72) Inventors: Davinder Pal Singh, Coquitlam (CA); Osvaldo Garcia Contreras, Vancouver (CA)

(73) Assignee: SAMSUNG ELECTRONICS COMPANY, LTD., Suwon City (KR)

( * ) Notice: Subject to any disclaimer, the term of this patent is extended or adjusted under 35 U.S.C. 154(b) by 373 days.

(21) Appl. No.: 18/396,408

(22) Filed: Dec. 26, 2023

(65) Prior Publication Data

US 2025/0211669 A1 Jun. 26, 2025

(51) Int. Cl.

*H04M 1/663* (2006.01)
*H04L 9/00* (2022.01)
*H04L 9/08* (2006.01)
*H04L 9/32* (2006.01)

(Continued)

(52) U.S. Cl.

CPC .......... *H04M 1/663* (2013.01); *H04L 9/0825* (2013.01); *H04L 9/3231* (2013.01); *H04L 9/3236* (2013.01); *H04L 9/3247* (2013.01); *H04L 9/50* (2022.05); *H04W 8/183* (2013.01); *H04W 12/069* (2021.01)

(58) Field of Classification Search

CPC ... H04M 1/663; H04W 12/069; H04W 8/183; H04L 9/50; H04L 9/0825; H04L 9/3231; H04L 9/3236; H04L 9/3247

See application file for complete search history.

(56) References Cited

U.S. PATENT DOCUMENTS 6,035,398 A * 3/2000 Bjorn .................... H04L 9/3231 713/185
7,844,252 B2 11/2010 Hodge
11,258,896 B1 2/2022 Cox (Continued)

FOREIGN PATENT DOCUMENTS

KR 20220082697 A 6/2022

OTHER PUBLICATIONS

Elad, "Robocall Statistics 2022—Facts & Trends, 20+ Surprising Robocalls Statistics That You Need To Know For 2023", Enterprise Apps Today, 12 pages, Jul. 11, 2022.

(Continued)

*Primary Examiner* — Junpeng Chen
(74) *Attorney, Agent, or Firm* — Baker Botts L.L.P.

(57) ABSTRACT

In one embodiment, a method includes receiving a request from a first user to register an electronic SIM card from a user device, authenticating biometric information of the first user that is accessed from the user device, generating a private key to be stored on the user device and a public key to be stored on a blockchain network based on the biometric information, determining a block associated with the first user exists on the blockchain network based on the private key, determining whether the first user is eligible for registration based on variables stored on the block, and registering the first user with the electronic SIM card if the first user is eligible for registration, else declining the request from the first user for registration.

18 Claims, 6 Drawing Sheets

(51) Int. Cl.
*H04W 8/18* (2009.01)
*H04W 12/069* (2021.01)

(56) References Cited

U.S. PATENT DOCUMENTS

| | | | | |
|---|---|---|---|---|
| 11,533,396 | B2 | 12/2022 | Johnson | |
| 2018/0131699 | A1* | 5/2018 | Park | H04L 63/0281 |
| 2020/0026834 | A1* | 1/2020 | Vimadalal | H04L 9/0825 |
| 2021/0168238 | A1 | 6/2021 | Adolphe | |
| 2023/0029053 | A1* | 1/2023 | Manuel-Devadoss | H04L 9/0825 |
| 2024/0064135 | A1* | 2/2024 | Sherlock | H04L 63/08 |
| 2025/0299179 | A1* | 9/2025 | Gagne-Keats | G06Q 20/4014 |

OTHER PUBLICATIONS

"Did Stir/Shaken's Implementation Effectively Stop Call Spoofing?", Caller ID Reputation, 6 pages, Jun. 8, 2022.

* cited by examiner

SYSTEMS AND METHODS FOR AUTHENTICATING CALLS USING BLOCKCHAIN TECHNOLOGY AND CRYPTOLOGY

TECHNICAL FIELD

This disclosure relates generally to wireless communications, and in particular relates to systems and methods for authenticated wireless communications.

BACKGROUND

In the age of digital communication, the proliferation of spam calls, robocalls, and fraudulent calls has increased significantly. In 2020, 40% of incoming calls were scams; every second, 2,700 robocalls are placed, only in the United States. Over 50 million residents in the United States lost their money to a scam phone call in 2020. Each Spam call lasts an average of 45 seconds. These unsolicited calls are not only a nuisance but can pose a severe threat to individual and business privacy leading to substantial financial and personal losses due to fraud. Caller identifier (ID) spoofing, where callers falsify the information transmitted to a caller ID to hide their identity, has become a common tactic in these activities. In 2021 FCC recognized that telephone fraud is one of the most popular scams. Existing solutions like STIR/SHAKEN have made strides toward mitigating this issue, but these solutions still rely on centralized certification authorities and are not foolproof. However, robocalls have found a way to spoof numbers that trick the STIR/SHAKEN technology or find alternative ways to reach people as this technology was mainly implemented to identify the origin of the call and identification not a protocol to block calls. The ineffectiveness of STIR/SHAKEN attestations to authenticate callers for contact centers may be a direct result of the protocols not being designed to verify or identify customers in the first place. The STIR/SHAKEN framework was intended to prevent, or at least signal, potential spam. STIR/SHAKEN does not actually stop robocalls from reaching people. The only tangible difference so far is that a call recipient may have additional information about the source of the communication so they can accept, reject, or block the caller.

DESCRIPTION OF EXAMPLE EMBODIMENTS

Figure 1:
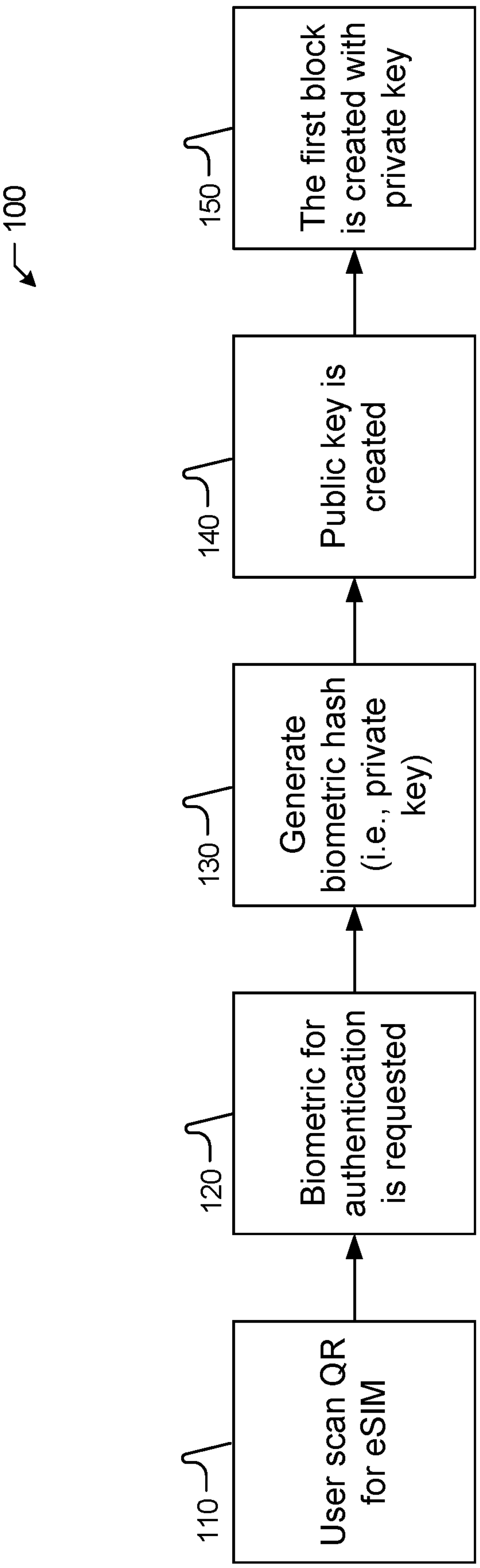
FIG. 1 illustrates an example block diagram for registering eSIM.

Authenticating Calls Using Blockchain Technology and Cryptology

In particular embodiments, a computing system may use blockchain technology and cryptographic digital signatures to authenticate and verify calls. The computing system may authenticate and verify calls for electronic SIM (eSIM) cards. In particular embodiments, each user may be associated with a unique pair of cryptographic keys, including a private key kept secret on a user device and a public key stored on a decentralized blockchain network. This unique pair of keys may be generated based on biometric authentication of a user. The computing system may identify that the user owns a device. As eSIM is a software solution, the computing system may make sure that every time that the user wants to move the eSIM to another device, the same authentication and verification process occurs, thereby allowing the eSIM always to have a unique pair key. When the user initiates a call, their device may use the private key to sign the call data digitally. This signature may be attached to the call, and the computing system (or the call recipient) may fetch the public key from the blockchain network and use it to verify the signature, thus confirming the call's authenticity. The embodiments disclosed herein provide a decentralized, more robust solution that verifies call authenticity right from the source, thereby significantly reducing the chances of spoofing and fraudulent calls. Although disclosure describes authenticating particular calls by particular systems in particular manners, this disclosure contemplates authenticating any suitable call by any suitable system in any suitable manner.

In particular embodiments, the computing system may receive, from a user device, a request from a first user to register an electronic SIM card. The computing system may then authenticate biometric information associated with the first user. In particular embodiments, the biometric information may be accessed from the user device. The computing system may further generate, based on the biometric information, a private key to be stored on the user device and a public key to be stored on a blockchain network. In particular embodiments, the computing system may determine, based on the private key, whether a block associated with the first user exists on the blockchain network. Based on determining the block associated with the first user exists on the blockchain network, the computing system may determine, based on one or more variables stored on the block, whether the first user is eligible for registration. Based on determining whether the first user is eligible for registration, the computing system may perform the following steps. If the first user is eligible for registration, the computing system may register the first user with the electronic SIM card. Else if the first user is not eligible for registration, the computing system may decline the request from the first user for registration.

Certain technical challenges exist for using blockchain technology and cryptographic digital signatures to authenticate calls. One technical challenge may include accurately identifying a user's true identity and authenticating a call based on the user's record in the blockchain network. The solution presented by the embodiments disclosed herein to address this challenge may be generating a unique pair of cryptographic keys including a private key on a user device and a public key stored on a decentralized blockchain network, as the private key comprises biometric information unique to the user and the public key can be used to verify a call digitally signed by the private key.

Certain embodiments disclosed herein may provide one or more technical advantages. A technical advantage of the embodiments may include robust spam call prevention as the computing system may verify call authenticity directly from the source to make it much harder for spammers to spoof numbers, significantly reducing the volume of spam and fraudulent calls. Another technical advantage of the embodiments may include decentralization of call verification as the computing system may use blockchain and a decentralized and distributed ledger to remove the need for a centralized authority for verification. Another technical advantage of the embodiments may include transparency and auditability as the use of blockchain may provide an immutable record of verified calls, allowing for better traceability and accountability. Another technical advantage of the embodiments may include enhanced user privacy as users may control their private keys, which are associated with biometric data unique to the user. Another technical advantage of the embodiments may include preventing a suspected spammer from registering eSIM again as relevant information is stored in the blockchain network and is checked anytime the suspected spammer attempts to register again. Certain embodiments disclosed herein may provide none, some, or all of the above technical advantages. One or more other technical advantages may be readily apparent to one skilled in the art in view of the figures, descriptions, and claims of the present disclosure.

In particular embodiments, an electronic device (e.g., a phone) may include a SIM array including an eSIM. The eSIM may be a programmable SIM card that is embedded directly into the electronic device. The eSIM may be inserted into the electronic device, provided integrally with the electronic device, or implemented to be accessible by the electronic device. The eSIM may allow the electronic device to perform an authenticating operation with a server of a communication provider (e.g., a mobile network operator) using information (e.g., a profile including universal subscriber identity module (USIM) information) within the eSIM. As an example and not by way of limitation, the eSIM may be activated instantly using scanning a quick response (QR) code corresponding to the communication operator.

In particular embodiment, the eSIM may be manufactured in a form of a dedicated card for a specific communication provider according to a request of the specific communication provider. The eSIM may be preloaded with authentication information (e.g., a USIM application and a subscriber ID (e.g., an IMSI)) and/or an encryption key (e.g., a known K value or Ki value) for a network access of the corresponding provider. An application (or information) within the eSIM may be installed, modified, deleted, or updated based on a scheme, such as an over the air (OTA) scheme when necessary.

In particular embodiments, the eSIM may download and/or store information for providing a communication service, in the form of a profile. The profile may be installed or stored in a manufacturing process of the eSIM or may be downloaded by the electronic device based on the OTA scheme and installed or stored in the eSIM. More information on eSIM may be found in U.S. Patent Application No. 2023/0171583, filed 25 Nov. 2022, and U.S. Patent Application No. 2023/0030914, filed 1 Jul. 2022, which are incorporated by reference.

FIG. 1 illustrates an example block diagram 100 for registering eSIM. In particular embodiments, a user may first register their eSIM to their device. At block 110, the user may scan a QR code for the eSIM. At block 120, the user's biometric information for authentication may be requested. As an example and not by way of limitation, the biometric information may comprises one or more of a faceprint, a fingerprint, a voiceprint, or an iris pattern. At block 130, the computing system may create a biometric hash for the user, which will act as a user identifier. The biometric hash may be stored in the blockchain network, which may be used to identify a particular block associated with the user in the blockchain network. In particular embodiments, the private key may comprise the biometric information. At block 140, a public key may be generated using the user's biometric information. As a result, the embodiments disclosed herein may have a technical advantage of enhanced user privacy as users may control their private keys, which are associated with biometric data unique to the user. Using a private key and a public key may reduce the user's exposure. At block 150, the first block of a blockchain network for the user may be created with the private key. A biometric hash may be uploaded to the first block with the public key and other information.

On registration, the user may be allotted a new phone number. The user may have to authenticate themselves using biometric information during the registration process. In particular embodiments, biometric authentication may include a matching process of verifying whether a user attempting authentication has the authority to access, and a process of determining whether biometric information is forged.

In particular embodiments, the biometric information may be encrypted using a hashing function. This hashed string may be searched in the blockchain network to find the block associated with the user. If the latest block is found where the user is marked as a suspected offender, the computing system may determine the user is not eligible for registration and the registration may fail. As a result, the embodiments disclosed herein may have a technical advantage of robust spam call prevention as the computing system may verify call authenticity directly from the source to make it much harder for spammers to spoof numbers, significantly reducing the volume of spam and fraudulent calls. If the phone number is spoofed, the computing system may be able to block the call or allow the call but averse to a user that the call is not authenticated.

Figure 2:
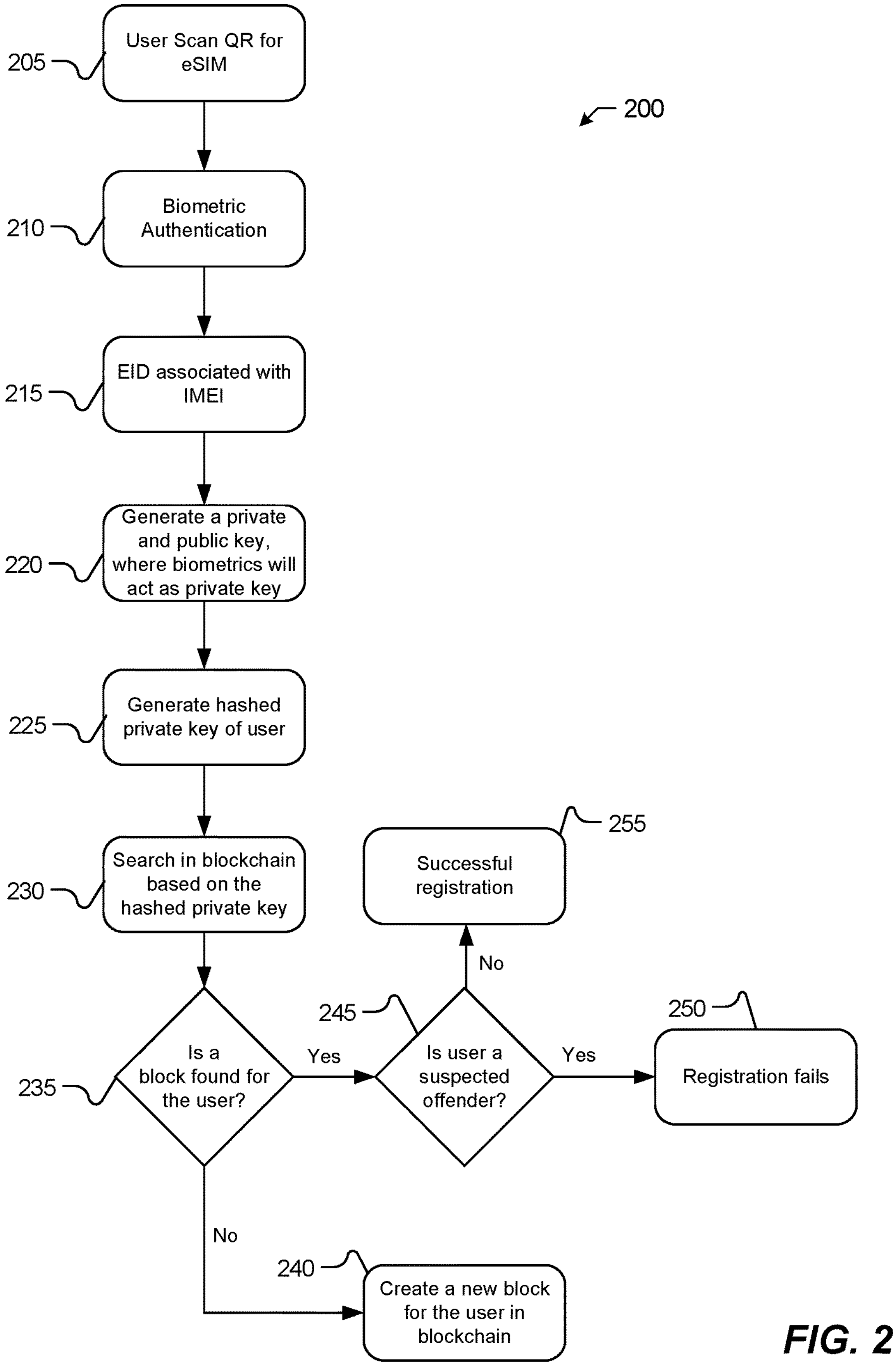
FIG. 2 illustrates an example flow diagram for registering eSIM.

FIG. 2 illustrates an example flow diagram 200 for registering eSIM. At step 205, the user may scan a QR code for the eSIM. At step 210, the computing system may perform biometric authentication. In an example embodiment, an electronic device of the user may generate an encrypted signal by varying standard parameters of the signal based on biometric data of the user. The computing system may authenticate the user by decrypting the encrypted signal received from the electronic device.

In another example embodiment, the computing system may extract an embedding vector from a machine-learning model configured to detect whether biometric information of a user is forged from received data including the biometric information. The machine-learning model may be trained to extract a feature or a feature vector suitable for detecting whether biometric information is forged. The machine-learning model may be trained based on a plurality of pieces of unspecified live biometric information and a plurality of pieces of unspecified forged biometric information. The computing system may calculate a confidence score based on the extracted embedding vector and determine whether to authenticate the biometric information based on the confidence score. As an example and not by way of limitation, the confidence score may correspond to a similarity score calculated based on a result of comparing the embedding vector to authentication information (for example, an enrolled feature vector of a fingerprint) included in a database. The confidence score may be calculated by, for example, a trained classifier, a regression neural network, and/or a neural-network model. The computing system may determine whether the confidence score is a score in a threshold range for authenticating the biometric information. More information on biometric authentication may be found in U.S. Patent Application No. 2023/0188520, filed 30 Jun. 2022, U.S. Patent Application No. 2022/0318354, filed 10 Feb. 2022, and U.S. Patent Application No. 2022/0318376, filed 16 Dec. 2021, which are incorporated by reference At step 215, the computing system may access the embedded identity document (EID) associated with the international mobile equipment identity (IMEI) of the user device. At step 220, the computing system may generate a private key and a pubic key for the user, wherein the biometrics may act as the private key. At step 225, the computing system may generate a hashed private key of the user from the private key based on one or more hash functions. At step 230, the computing system may search the blockchain network based on the hashed private key. At step 235, the computing system may determine whether there is a block found for the user based on the hashed private key. If a block is not found, the flow diagram 200 may proceed to step 240, where the computing system may create a new block for the user in the blockchain network. If a block is found, the flow diagram 200 may proceed to step 245. The computing system may determine whether the user is a suspected offender based on data (i.e., one or more variables) stored in the block. As an example and not by way of limitation, the one or more variables may comprise one or more of an offense count, an indicator of suspected offender, a phone number, a user identifier, a public key, or a time when the block was last updated. If the user is a suspected offender, the registration may fail at step 250. If the user is not a suspected offender, the computing system may successfully register the electronic SIM card for the user at step 255. The embodiments disclosed herein may have another technical advantage of decentralization of call verification as the computing system may use blockchain and a decentralized and distributed ledger to remove the need for a centralized authority for verification. Instead, trust may be distributed among all participants in the blockchain network.

In particular embodiments, the computing system may receive, from the user device, an initialization from the first user to call a second user. The initialization may be associated with a digital signature generated based on the private key. The computing system may verify the digital signature based on a comparison between the digital signature and the public key. In particular embodiments, the computing system may access the block associated with the first user on the blockchain network. The computing system may then determine the first user is eligible for calling the second user based on one or more variables stored in the block. The computing system may further establish the call between the first user and the second user. Generating a unique pair of cryptographic keys including a private key on a user device and a public key stored on a decentralized blockchain network may be an effective solution for addressing the technical challenge of accurately identifying a user's true identity and authenticating a call based on the user's record in the blockchain network, as the private key comprises biometric information unique to the user and the public key can be used to verify a call digitally signed by the private key.

Figure 3:
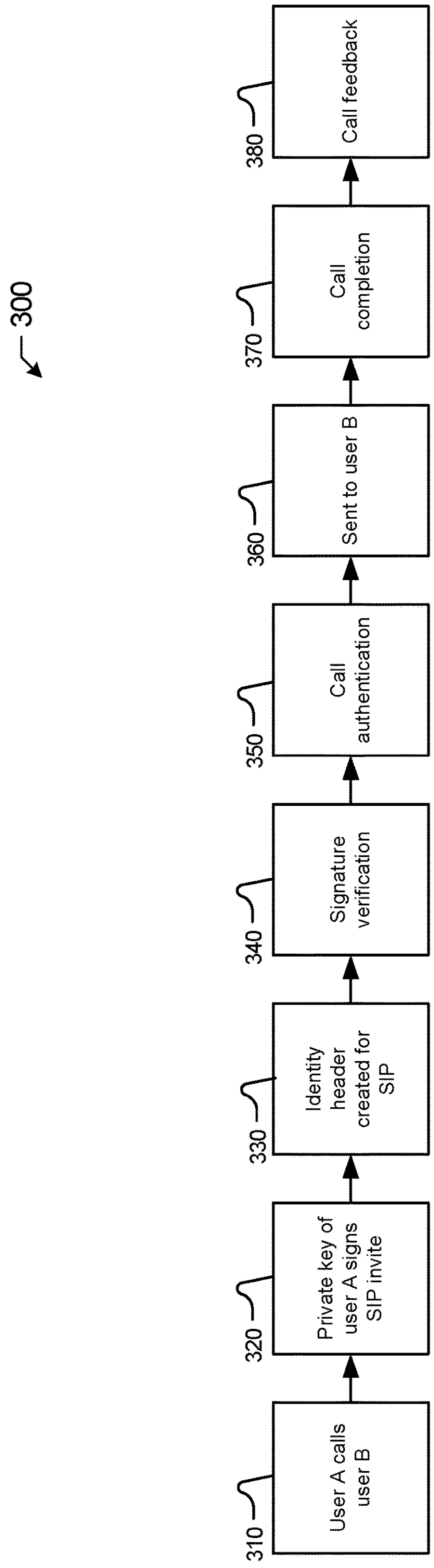
FIG. 3 illustrates an example flow diagram for authenticating a call from a user using the disclosed blockchain verification system.

FIG. 3 illustrates an example flow diagram 300 for authenticating a call from a user using the disclosed blockchain verification system. Suppose the example flow diagram 300 illustrates a call from user A with number 111-111 to user B with number 555-555. Step 310 is call initiation, where user A initiates a call on their device to number 555-555. The device of user A may generate a SIP invite message containing the relevant call information. Step 320 is signature generation, where the device of user A may use the user's private key (stored securely on their device) to digitally sign the call information in the SIP invite message. This step may generate a digital signature (public key). At step 330, the computing system may create identity header. During this step, the digital signature may be included in the SIP invite message as part of the identity header. This may also include a timestamp or nonce for added security. The device of user A may then send the SIP invite message, including the identity header, into the network towards user B.

Step 340 is signature verification, where an intermediate service on the network may receive the SIP invite message. In particular embodiments, the intermediate service may be any network entity that sits between the calling and receiving parties and facilitates the authentication of calls using the blockchain system. The intermediate service may extract the digital signature from the identity header and fetch the public key of user A from the blockchain using the phone number (e.g., 111-111) of user A. Step 350 is call authentication, where the intermediate service uses the public key to verify the digital signature. If the signature is valid, it may prove that the call originated from a device with access to the private key of user A and that the call data has not been tampered with. In particular embodiments, the information of whether the caller is a suspected offender may be also checked. If the caller is a suspected offender, the verification fails. If the verification fails, the call will be rejected.

If the digital signature is verified, the call may be sent to user B at step 360, where user B sees the incoming call from 111-111. Step 370 is call completion. Step 380 is call feedback. Once the call is completed, user B may be asked for the feedback of the call in a scenario where user A is unknown to user B. In this way, the blockchain based system may provide a means to verify the authenticity of calls, making it harder to perform call spoofing or other forms of telephony fraud. The embodiments disclosed herein may have another technical advantage of transparency and auditability as the use of blockchain may provide an immutable record of verified calls, allowing for better traceability and accountability.

In particular embodiments, a feedback step may help in identifying the fraudulent callers. The embodiments disclosed herein may enable an end user to mark a call as undesirable or not. When a call is received from someone not in a user's contacts, the user may be shown a dialogue to mark the contact associated with the call as spam. A user may be able to mark a call as spam only once. This mechanism may help avoid a scenario where a user maliciously tries to label a caller as a fraudulent caller. Once a user labels a caller as a fraudulent caller, the offence count in the block associated with the caller may be updated. If the offence count passes a threshold, the computing system may mark the caller as a fraudulent caller.

In particular embodiments, the computing system may receive user feedback from the second user. The user feedback may indicate the first user is a suspected offender. Accordingly, the computing system may incrementally update the offense count. In particular embodiments, the computing system may determine the offense count exceeds a threshold number. The computing system may further update the indicator of suspected offender as true for the first user. As a result, the embodiments disclosed herein may have another technical advantage of preventing a suspected spammer from registering eSIM again as relevant information is stored in the blockchain network and is checked anytime the suspected spammer attempts to register again.

Figure 4:
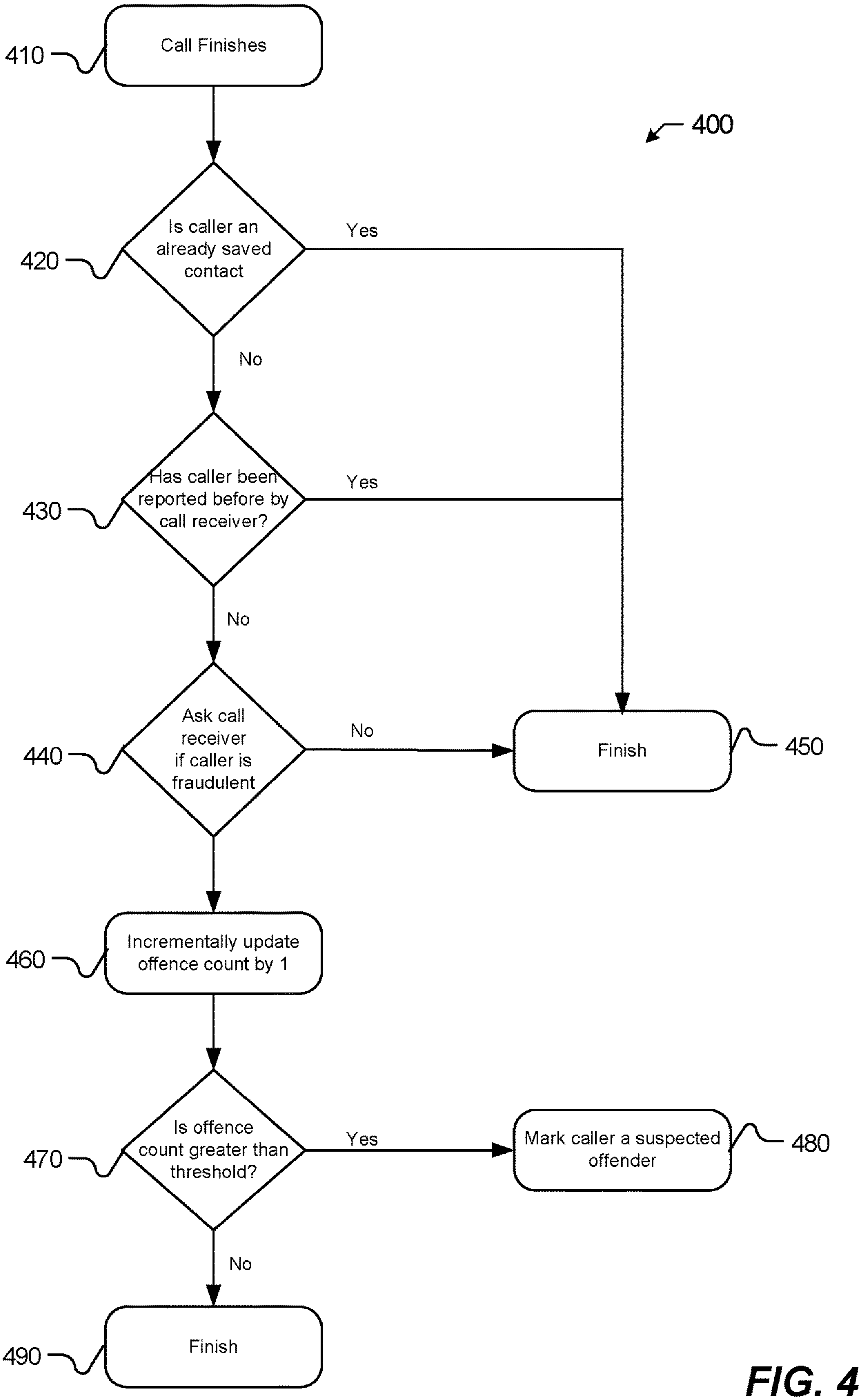
FIG. 4 illustrates an example flow diagram associated with call feedback.

FIG. 4 illustrates an example flow diagram 400 associated with call feedback. At step 410, a call between a caller and a call receiver finishes. At 420, the computing system may determine whether the caller is an already saved contact of the call receiver. If the caller is an already saved contact, the flow diagram 400 may finish at step 450. If the caller is not an already saved contact, the computing system may determine whether this caller has been reported before by the call receiver at step 430. If this caller has been reported before by the call receiver, the flow diagram 400 may finish at step 450. If this caller has not been reported before by the call receiver, the computing system may ask the call receiver if the caller is a fraudulent at step 440. If the call receiver indicates the caller is not fraudulent, the flow diagram 400 may finish at step 450. If the call receiver indicates the caller is fraudulent, the computing system may incrementally update the offence count by 1 at step 460. At step 470, the computing system may determine if the offence count is greater than a threshold. If the offence count is greater than the threshold, the computing system may mark the caller as a suspected offender at step 480. If the offence count is not greater than the threshold, the flow diagram 400 may finish at step 490.

In particular embodiments, the computing system may use a tribunal process to accept an application in case of a failed registration due to a suspected offender. The user may submit the necessary identity information and file an appeal. The tribunal may then investigate by pulling out information from all the blocks associated with that particular user. The tribunal may decide whether to approve the registration of the user based on the information.

In alternative embodiments, the blockchain based verification system may be implemented using a centralized database. The centralized database may maintain the information of each user. The registration process may check if the biometric hash of the user is already present in the centralized database. The computing system may then verify if the user is a fraudulent caller. The registration process may fail if the user is a fraudulent caller. Each record associated with the user may comprise similar information as the one present in a block of the blockchain network, As an example and not by way of limitation, such information may include public key, biometric hash, flag indicating whether the user is a suspected offender, phone number, offence count, and time the record was created and updated. The signing of the call may work in the same way as defined above where the user's biometric key will be used to sign the call. Similarly, authenticating the call may be similar, where phone number may be used to fetch the public key that will in turn be used to verify the caller and the flag indicating whether the user is a suspected offender may be used to flag the call. The feedback mechanism may be also similar, wherein each user report that a caller is a fraudulent caller may result in the record in the centralized database being updated.

Figure 5:
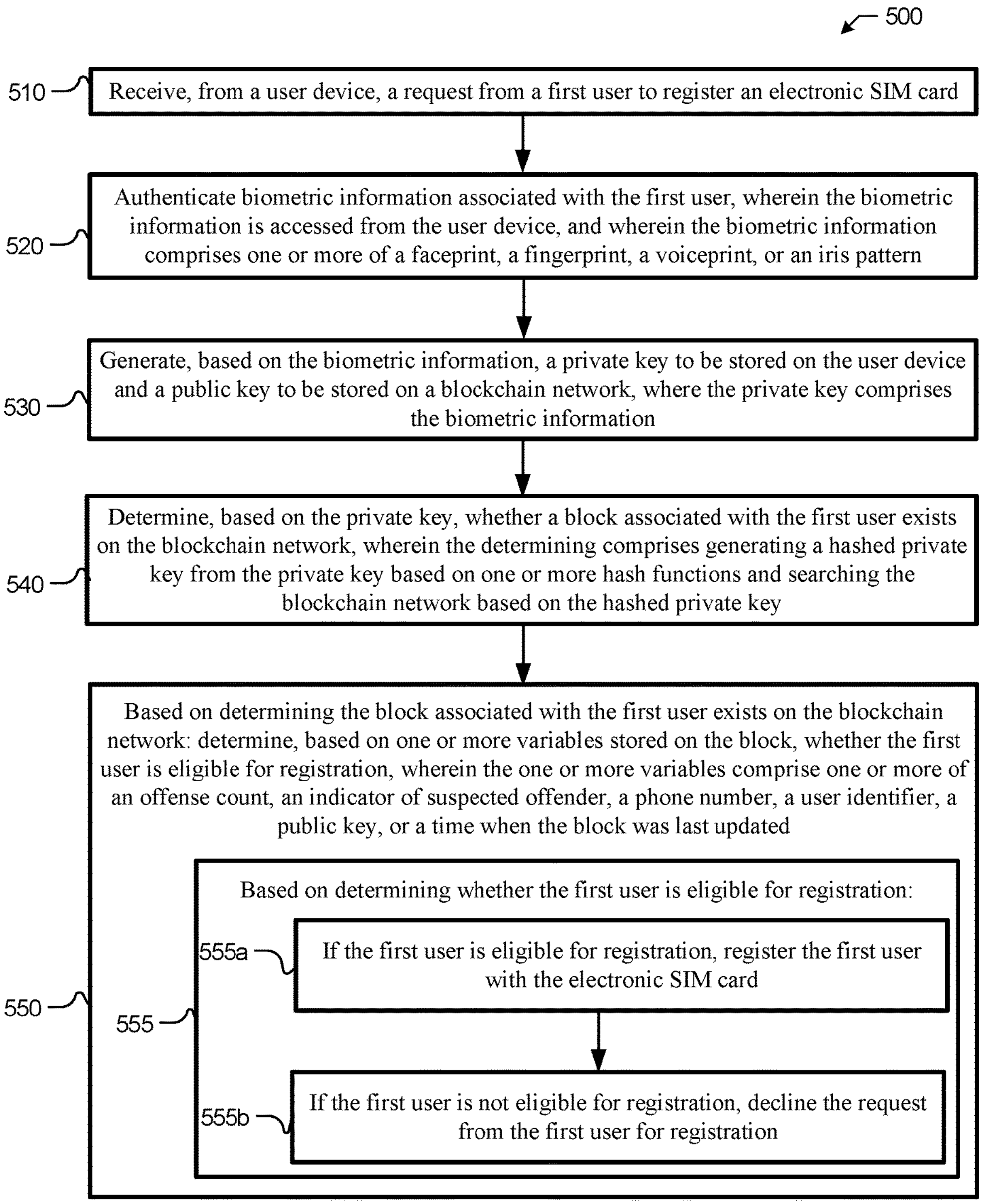
FIG. 5 illustrates is a flow diagram of a method for using blockchain technology and cryptographic digital signatures to authenticate calls, in accordance with the presently disclosed embodiments.

FIG. 5 illustrates is a flow diagram of a method 500 for using blockchain technology and cryptographic digital signatures to authenticate calls, in accordance with the presently disclosed embodiments. The method 500 may be performed utilizing one or more processing devices (e.g., a computing system) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing wireless communication data, software (e.g., instructions running/executing on one or more processors), firmware (e.g., microcode), or some combination thereof.

The method 500 may begin at step 510 with the one or more processing devices (e.g., the computing system). For example, in particular embodiments, the computing system may access a modulated symbol sequence comprising a plurality of symbols. The method 500 may then continue at step 510 with the one or more processing devices (e.g., the computing system). For example, in particular embodiments, the computing system may receive, from a user device, a request from a first user to register an electronic SIM card. The method 500 may then continue at step 520 with the one or more processing devices (e.g., the computing system). For example, in particular embodiments, the computing system may authenticate biometric information associated with the first user, wherein the biometric information is accessed from the user device, and wherein the biometric information comprises one or more of a faceprint, a fingerprint, a voiceprint, or an iris pattern. The method 500 may then continue at step 530 with the one or more processing devices (e.g., the computing system). For example, in particular embodiments, the computing system may generate, based on the biometric information, a private key to be stored on the user device and a public key to be stored on a blockchain network, where the private key comprises the biometric information. The method 500 may then continue at step 540 with the one or more processing devices (e.g., the computing system). For example, in particular embodiments, the computing system may determine, based on the private key, whether a block associated with the first user exists on the blockchain network, wherein the determining comprises generating a hashed private key from the private key based on one or more hash functions and searching the blockchain network based on the hashed private key. The method 500 may then continue at step 550 with the one or more processing devices (e.g., the computing system). For example, in particular embodiments, the computing system may, based on determining the block associated with the first user exists on the blockchain network: determine, based on one or more variables stored on the block, whether the first user is eligible for registration, wherein the one or more variables comprise one or more of an offense count, an indicator of suspected offender, a phone number, a user identifier, a public key, or a time when the block was last updated. The method 500 may then continue at step 555 with the one or more processing devices (e.g., the computing system). Based on determining whether the first user is eligible for registration, the method 500 may then continue at step 555*a* or step 555*b* with the one or more processing devices (e.g., the computing system). For example, in particular embodiments, the computing system may register the first user with the electronic SIM card at step 555*a* if the first user is eligible for registration. As another example, in particular embodiments, the computing system may decline the request from the first user for registration at step 555*b* if the first user is not eligible for registration. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for using blockchain technology and cryptographic digital signatures to authenticate calls including the particular steps of the method of FIG. 5, this disclosure contemplates any suitable method for using blockchain technology and cryptographic digital signatures to authenticate calls including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Systems and Methods

Figure 6:
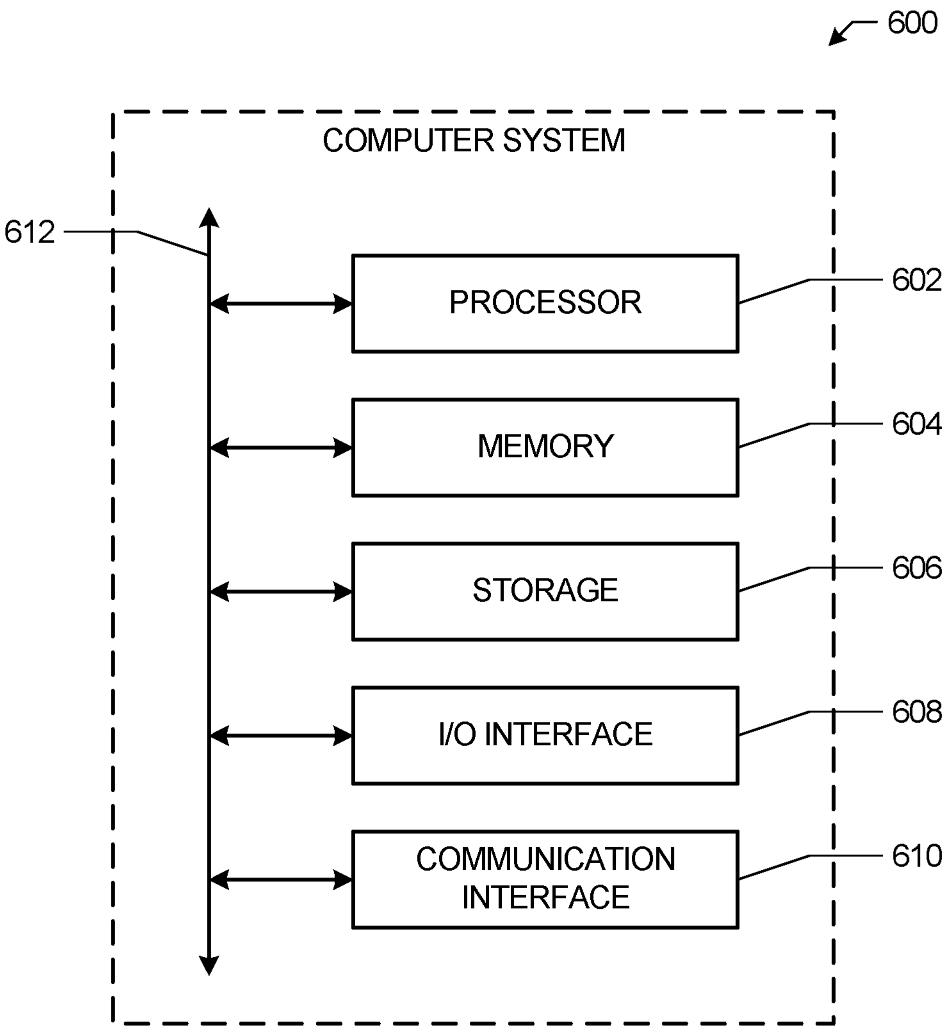
FIG. 6 illustrates an example computer system that may be utilized to perform automated control of smart appliances, in accordance with the presently disclosed embodiments.

FIG. 6 illustrates an example computer system 600 that may be utilized to perform automated control of smart appliances, in accordance with the presently disclosed embodiments. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks.

Where appropriate, one or more computer systems 600 may perform without substantial spatial or temporal limitation one or more steps of one or more methods described or illustrated herein. As an example, and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement. In particular embodiments, processor 602 includes hardware for executing instructions, such as those making up a computer program. As an example, and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example, and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602.

Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example, and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere).

One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memory devices, where appropriate. Although this disclosure describes and illustrates particular memory, this disclosure contemplates any suitable memory.

In particular embodiments, storage 606 includes mass storage for data or instructions. As an example, and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example, and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it.

As an example, and not by way of limitation, computer system 600 may communicate with an ad hoc network, a personal area network (PAN), a local area network (LAN), a wide area network (WAN), a metropolitan area network (MAN), an ultra-wideband network (UWB), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example, and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:

receiving, from a user device, a request from a first user to register an electronic SIM card;

authenticating biometric information associated with the first user, wherein the biometric information is accessed from the user device;

generating, based on the biometric information, a private key to be stored on the user device and a public key to be stored on a blockchain network;

determining, based on the private key, whether a block associated with the first user exists on the blockchain network, the determining comprising generating a hashed private key from the private key based on one or more hash functions and searching the blockchain network based on the hashed private key; and based on determining the block associated with the first user exists on the blockchain network:

determining, based on one or more variables stored on the block, whether the first user is eligible for registration; and based on determining whether the first user is eligible for registration:

if the first user is eligible for registration:

registering the first user with the electronic SIM card; else if the first user is not eligible for registration:

declining the request from the first user for registration.

2. The method of claim 1, further comprising:

receiving, from the user device, an initialization from the first user to call a second user, wherein the initialization is associated with a digital signature generated based on the private key;

verifying the digital signature based on a comparison between the digital signature and the public key;

accessing the block associated with the first user on the blockchain network;

determining the first user is eligible for calling the second user based on one or more variables stored in the block; and establishing the call between the first user and the second user.

3. The method of claim 2, wherein the one or more variables comprise an offense count and an indicator of suspected offender, wherein the method further comprises:

receiving user feedback from the second user, wherein the user feedback indicates the first user is a suspected offender;

incrementally updating the offense count;

determining the offense count exceeds a threshold number; and updating the indicator of suspected offender as true for the first user.

4. The method of claim 1, wherein the biometric information comprises one or more of a faceprint, a fingerprint, a voiceprint, or an iris pattern.

5. The method of claim 1, where the private key comprises the biometric information.

6. The method of claim 1, wherein the one or more variables comprise one or more of an offense count, an indicator of suspected offender, a phone number, a user identifier, a public key, or a time when the block was last updated.

7. An electronic device comprising:

one or more non-transitory computer-readable storage media including instructions; and one or more processors coupled to the storage media, the one or more processors configured to execute the instructions to:

receive, from a user device, a request from a first user to register an electronic SIM card;

authenticate biometric information associated with the first user, wherein the biometric information is accessed from the user device;

generate, based on the biometric information, a private key to be stored on the user device and a public key to be stored on a blockchain network;

determine, based on the private key, whether a block associated with the first user exists on the blockchain network, the determining comprising generating a hashed private key from the private key based on one or more hash functions and searching the blockchain network based on the hashed private key; and based on determining the block associated with the first user exists on the blockchain network:

determine, based on one or more variables stored on the block, whether the first user is eligible for registration; and based on determining whether the first user is eligible for registration:

if the first user is eligible for registration:

register the first user with the electronic SIM card; else if the first user is not eligible for registration:

decline the request from the first user for registration.

8. The electronic device of claim 7, wherein the one or more processors are further configured to execute the instructions to:

receive, from the user device, an initialization from the first user to call a second user, wherein the initialization is associated with a digital signature generated based on the private key;

verify the digital signature based on a comparison between the digital signature and the public key;

access the block associated with the first user on the blockchain network;

determine the first user is eligible for calling the second user based on one or more variables stored in the block; and establish the call between the first user and the second user.

9. The electronic device of claim 8, wherein the one or more variables comprise an offense count and an indicator of suspected offender, wherein the one or more processors are further configured to execute the instructions to:

receive user feedback from the second user, wherein the user feedback indicates the first user is a suspected offender;

incrementally update the offense count;

determine the offense count exceeds a threshold number; and update the indicator of suspected offender as true for the first user.

10. The electronic device of claim 7, wherein the biometric information comprises one or more of a faceprint, a fingerprint, a voiceprint, or an iris pattern.

11. The electronic device of claim 7, where the private key comprises the biometric information.

12. The electronic device of claim 7, wherein the one or more variables comprise one or more of an offense count, an indicator of suspected offender, a phone number, a user identifier, a public key, or a time when the block was last updated.

13. A computer-readable non-transitory storage media comprising instructions executable by a processor to:

receive, from a user device, a request from a first user to register an electronic SIM card;

authenticate biometric information associated with the first user, wherein the biometric information is accessed from the user device;

generate, based on the biometric information, a private key to be stored on the user device and a public key to be stored on a blockchain network;

determine, based on the private key, whether a block associated with the first user exists on the blockchain network, the determining comprising generating a hashed private key from the private key based on one or more hash functions and searching the blockchain network based on the hashed private key; and based on determining the block associated with the first user exists on the blockchain network:

determine, based on one or more variables stored on the block, whether the first user is eligible for registration; and based on determining whether the first user is eligible for registration:

if the first user is eligible for registration:

register the first user with the electronic SIM card; else if the first user is not eligible for registration:

decline the request from the first user for registration.

14. The computer-readable non-transitory storage media of claim 13, further comprising instructions executable by the processor to:

receive, from the user device, an initialization from the first user to call a second user, wherein the initialization is associated with a digital signature generated based on the private key;

verify the digital signature based on a comparison between the digital signature and the public key;

access the block associated with the first user on the blockchain network;

determine the first user is eligible for calling the second user based on one or more variables stored in the block; and establish the call between the first user and the second user.

15. The computer-readable non-transitory storage media of claim 14, wherein the one or more variables comprise an offense count and an indicator of suspected offender, wherein the computer-readable non-transitory storage media further comprises instructions executable by the processor to:

receive user feedback from the second user, wherein the user feedback indicates the first user is a suspected offender;

incrementally update the offense count;

determine the offense count exceeds a threshold number; and update the indicator of suspected offender as true for the first user.

16. The computer-readable non-transitory storage media of claim 13, wherein the biometric information comprises one or more of a faceprint, a fingerprint, a voiceprint, or an iris pattern.

17. The computer-readable non-transitory storage media of claim 13, where the private key comprises the biometric information.

18. The computer-readable non-transitory storage media of claim 13, wherein the one or more variables comprise one or more of an offense count, an indicator of suspected offender, a phone number, a user identifier, a public key, or a time when the block was last updated.

* * * * *